US008108413B2

(12) United States Patent
Kar et al.

(10) Patent No.: US 8,108,413 B2
(45) Date of Patent: Jan. 31, 2012

(54) METHOD AND APPARATUS FOR AUTOMATICALLY DISCOVERING FEATURES IN FREE FORM HETEROGENEOUS DATA

(75) Inventors: Gautam Kar, Yorktown Heights, NY (US); Ruchi Mahindru, Yonkers, NY (US); Anca Sailer, Scarsdale, NY (US); Xing Wei, Amherst, MA (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 11/675,396

(22) Filed: Feb. 15, 2007

(65) Prior Publication Data

US 2008/0201131 A1 Aug. 21, 2008

(51) Int. Cl.
*G06F 7/00* (2006.01)

(52) U.S. Cl. .................. 707/758; 707/769; 707/802

(58) Field of Classification Search .............. 707/104.1, 707/100, 10, 2, 999.102, 999, 758, 769, 802, 707/999.104
See application file for complete search history.

(56) References Cited

U.S. PATENT DOCUMENTS

| | | | |
|---|---|---|---|
| 5,671,436 A * | 9/1997 | Morris et al. ........................ 1/1 |
| 6,212,494 B1 | 4/2001 | Boguraev |
| 6,542,518 B1 * | 4/2003 | Miyazawa ................... 370/468 |
| 6,829,734 B1 | 12/2004 | Kreulen et al. |
| 6,892,193 B2 | 5/2005 | Bolle et al. |
| 7,106,903 B2 | 9/2006 | Chang et al. |
| 7,415,509 B1 * | 8/2008 | Kaltenmark et al. ......... 709/219 |
| 7,490,085 B2 | 2/2009 | Walker et al. |
| 7,720,214 B2 * | 5/2010 | Ricketts ................... 379/265.02 |
| 2003/0154181 A1 | 8/2003 | Liu et al. |
| 2003/0167163 A1 | 9/2003 | Glover et al. |
| 2003/0212654 A1* | 11/2003 | Harper et al. ..................... 707/1 |
| 2003/0226100 A1 | 12/2003 | Farahat et al. |
| 2004/0049498 A1* | 3/2004 | Dehlinger et al. ................. 707/3 |
| 2005/0027664 A1 | 2/2005 | Johnson et al. |
| 2005/0108256 A1* | 5/2005 | Wakefield et al. ............ 707/100 |
| 2006/0026203 A1 | 2/2006 | Tan et al. |
| 2006/0143175 A1 | 6/2006 | Ukrainczyk et al. |

(Continued)

FOREIGN PATENT DOCUMENTS

EP PCTEP2008051726 6/2008

OTHER PUBLICATIONS

S. Spangler et al., "Knowledge Base Maintenance Using Knowledge Gap Analysis," Procs. of the 7th ACM SIGKDD International Conference on Knowledge Discovery and Data Mining, 2001, pp. 462-466, California.

(Continued)

*Primary Examiner* — Eliyah S Harper
(74) *Attorney, Agent, or Firm* — Anne V. Dougherty; Ryan, Mason & Lewis, LLP

(57) ABSTRACT

Techniques are provided for automatically discovering one or more features in free form heterogeneous data. In one aspect of the invention, the techniques include obtaining free form heterogeneous data, wherein the data comprises one or more data items, applying a label to each data item, using the labeled data to build a language model, wherein a word distribution associated with each label can be derived from the model, and using the word distribution associated with each label to discover one or more features in the data, wherein discovering one or more features in the data facilitates one or more operations that use at least a portion of the labeled data.

35 Claims, 4 Drawing Sheets

U.S. PATENT DOCUMENTS

| | | | |
|---|---|---|---|
| 2006/0179016 | A1 | 8/2006 | Forman et al. |
| 2006/0222239 | A1 | 10/2006 | Bargeron et al. |
| 2006/0245641 | A1 | 11/2006 | Viola et al. |
| 2006/0255124 | A1 | 11/2006 | Hoch et al. |
| 2007/0005341 | A1 | 1/2007 | Burges et al. |
| 2007/0143101 | A1* | 6/2007 | Goutte .............................. 704/9 |
| 2008/0120129 | A1 | 5/2008 | Seubert et al. |
| 2008/0201131 | A1 | 8/2008 | Kar et al. |

OTHER PUBLICATIONS

W. Li et al., "Semi-Supervised Sequence Modeling with Syntactic Topic Models," AAAI, 2005, pp. 813-818.

D. Pinto et al., "Table Extraction Using Conditional Random Fields," Procs. of SIGIR, 2003, pp. 235-242, Canada.

J. Lafferty et al.., "Conditional Random Fields: Probabilistic Models for Segmenting and Labeling Sequence Data," Procs. of the 18th International Conference on Machine Learning, 2001, pp. 282-289.

U.S. Appl. No. 11/675,392 filed in the name of G. Kar et al. on Feb. 15, 2007 and entitled "Method and Apparatus for Automatically Structuring Free Form Heterogenous Data".

S. Spangler et al., "Interactive Methods for Taxonomy Editing and Validation," Next Generation of Data-Mining Applications, 2005, pp. 495-522.

S. Kullback et al., "On Information and Sufficiency," The Annals of Mathematical Statistics, Mar. 1951, pp. 79-86.

T. Li et al., "An Integrated Framework on Mining Logs Files for Computing System Management," Procs. of the 11th ACM SIGKDD International Conference on Knowledge Discovery in Data Mining, Aug. 2005, pp. 776-781, Illinois.

C.M Lee et al., "Combining Acoustic and Language Information for Emotion Recognition," 7th International Conference on Spoken Language Processing, ICSLP, 2002, 4 pages, Colorado.

D. Padmanabhan et al., "Mining Conversational Text for Procedures," Proc. of the IJCAI Workshop on Analytics for Noisy Unstructured Text Data, 2007, pp. 163-170.

* cited by examiner

METHOD AND APPARATUS FOR AUTOMATICALLY DISCOVERING FEATURES IN FREE FORM HETEROGENEOUS DATA

CROSS-REFERENCE TO RELATED APPLICATIONS

The present application is related to U.S. patent application Ser. No. 11/675,392, filed concurrently herewith, and entitled "Method and Apparatus for Automatically Structuring Free Form Heterogeneous Data," the disclosure of which is incorporated by reference herein.

FIELD OF THE INVENTION

The present invention generally relates to data processing, and, more particularly, to a method and apparatus for automatically discovering features in free form heterogeneous data.

BACKGROUND OF THE INVENTION

The problem of understanding free form data content is motivated, in part, by a need to search and analyze problem or trouble tickets (PT or TT), a task which cannot be performed effectively on the original free form textual data. An example of an application where a better understanding of the free form data content, as well as a more effective representation of the data for computers are required, is the process followed by Call Center personnel to resolve customer information technology (IT) problems.

A Call Center offers support for customers to help them solve the problems they experience with commercial products. In the case of IT Operations Call Centers, these can include, for example, hardware and software products. A problem ticket is a record of a problem that a customer is experiencing, the subsequent telephone call and electronic mail (e-mail) exchanges with the technical support personnel on that issue, as well as of any other information that the technical support personnel considers relevant to describing or solving the issue. Thus, when a technical support personnel needs to solve a problem, he or she can first check to see if the problem has been reported for another customer. If it has, the technical support personnel can read how to fix the problem and avoid spending the time trying to solve problems that other people have already solved.

The information of interest (for example, the problem description and resolution) for level one and two personnel in a Call Center is recorded by using specific PT management tools, typically in free form text. Thus, most of the useful PT data is not explicitly structured because it is highly noisy (for example, contains inconsistent formatting), and very heterogeneous in content (for example, natural language, system generated data, domain specific terms, etc.), making it difficult to effectively apply common data mining techniques to analyze and search the raw data.

Existing approaches for automatically searching for a particular topic in a PT collection of free form documents retrieve an overwhelmingly large amount of irrelevant tickets, presenting the technical assistance personnel with the tedious work of manually searching for relevant data buried in the free form text.

Existing approaches to discover text features are primarily based on manual construction from extensive experience with the data. The drawback of manually producing features is that an expert needs to read and understand a large volume of data to create a set of relevant features. Some existing approaches have focused on discovering new textual features based on term relationships and on additional resources other than the training data, such as dictionaries. These efforts mainly focus on word and/or phrase tagging, like part-of-speech tagging and name tagging. However, none of these complex text features have been used in labeling units of text to recognize the information type of a particular unit of text rather than only of particular words and/or phrases.

Existing approaches include, for example, U.S. Pat. No. 6,829,734 entitled "Method for discovering problem resolutions in a free form computer helpdesk data set," which includes a method and structure for discovering problem resolution in a helpdesk data set of problem tickets based on using an enumerated set of phrases that have been identified as indicating diagnosis, instruction, or corrective action.

Another existing approach includes U.S. Pat. No. 6,892,193 entitled "Method and apparatus for inducing classifiers for multimedia based on unified representation of features reflecting disparate modalities," which includes a method to perform categorization (classification) of multimedia items.

Also, U.S. Pat. No. 7,106,903 is an existing approach entitled "Dynamic partial function in measurement of similarity of objects," which includes a method of measuring similarity of a first object represented by first set of feature values to a second object represented by a second set of feature values. U.S. Patent Application No. 2003/0154181, entitled "Document clustering with cluster refinement and model selection capabilities," includes a document partitioning (flat clustering) method that clusters documents with high accuracy and accurately estimates the number of clusters in the document corpus.

Another existing approach includes U.S. Patent Application No. 2003/0167163, entitled "Inferring hierarchical descriptions of a set of documents," which includes a method for automatically determining groups of words or phrases that are descriptive names of a small set of documents. Also, U.S. Patent Application No. 2003/0226100, entitled "Systems and methods for authoritativeness grading, estimation and sorting of documents in large heterogeneous document collections," includes a method for determining the authoritativeness of a document based on textual, non-topical cues.

U.S. Patent No. 2006/0026203, entitled "Method and system for discovering knowledge from text documents," includes a method for discovering knowledge from text documents. Also, U.S. Patent Application No. 2006/0143175, entitled "System and method for automatically classifying text," includes a method for automatically classifying text into categories.

Also, U.S. Patent Application No. 2006/0179016, entitled "Preparing data for machine learning," includes a method for feature selection. Additionally, U.S. Patent Application No. 2006/0222239, entitled "Systems and methods for detecting text," includes employing a boosted classifier and a transductive classifier to provide accurate and efficient text detection systems and/or methods. U.S. Patent Application No. 2006/0255124, entitled "Method and system for discovering significant subsets in collection of documents," includes a method of discovering a significant subset in a collection of documents, includes identifying a set of documents from a plurality of documents based on a likelihood that documents in the set of documents.

Disadvantages of the existing approaches include providing solutions for text classification that do not directly address the automatic feature generation. Also, disadvantages of the existing approaches addressing feature generation include basing feature generation on traditional keyword features and, in most existing approaches, exclusively using documents that have a known structure.

It would thus be desirable to overcome the limitations in previous free form data feature discovery approaches.

SUMMARY OF THE INVENTION

Principles of the present invention provide techniques for automatically discovering one or more features in free form heterogeneous data.

For example, in one aspect of the invention, a technique for automatically discovering one or more features in free form heterogeneous data includes the following steps. Free form heterogeneous data is obtained, wherein the data comprises one or more data items. A label is applied to each data item. The labeled data is used to build a language model, wherein a word distribution associated with each label can be derived from the model. Also, the word distribution associated with each label is used to discover one or more features in the data, wherein discovering one or more features in the data facilitates one or more operations that use at least a portion of the labeled data.

In another aspect of the invention, a technique for automatically discovering one or more features in free form problem ticket data to facilitate one or more information technology (IT) operations includes the following steps. Free form problem ticket data is obtained. A portion of the data is labeled. The labeled data is grouped into one or more groups, wherein each group is associated with a label. A language model is generated for each group, wherein the model computes a word distribution for each group. The word distribution is used to discover one or more features in the data. The one or more discovered features are expanded, and the one or more expanded features are used to facilitate one or more information technology (IT) operations.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

At least one embodiment of the invention may provide one or more beneficial technical effects, such as, for example, more effective implementation of a machine learning system as compared to a feature set discovered through traditional heuristic based methods.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention include techniques to automatically discover features, particularly text related features, in free form heterogeneous textual data. As used here, a "text feature" is a property of the text which can be used in systems such as machine learning systems or simple rule-based systems for recognizing the information type of a particular unit of text. Also, as used herein, "free form data" refers to data that does not reside in fixed locations. By way of example, free form data may include unstructured text in a word processing document. Additionally, as used herein, "trouble ticket (TT)" as well as "problem ticket" refer to a mechanism used to track the detection, reporting, and resolution of some type of problem.

Principles of the present invention use an extended set of features, including keywords present in documents and features based on external resources, to address issues faced in circumstances involving heterogeneous documents, like ones, for example, that combine free text with machine generated text, programming code, etc.

An illustrative embodiment of the invention includes algorithms and processes to discover features from training data. A language model is built for the annotated data according to labels. Thus, the word distribution associated with each label can be derived from the language model. Manual effort can be then applied to select new keyword features by ranking the word probability.

An illustrative embodiment of the invention also includes algorithms and processes to discover features with the help of external resources, such as unlabeled data and external rule-based system related to similar data. Because manual labeling is very tedious and expensive, the availability of labeled data and manually constructed features is limited. The training data features are extended by automatically discovering their correlations with features in the external resources.

Once the features are discovered by the techniques described herein, the features can be used to automatically generate a training label model. One exemplary advantage of the feature set discovered using one or more embodiments of the present invention is that it can be used more effectively in a machine learning system as compared to a feature set discovered through traditional heuristic based methods when applied to automatic labeling.

Figure 1:
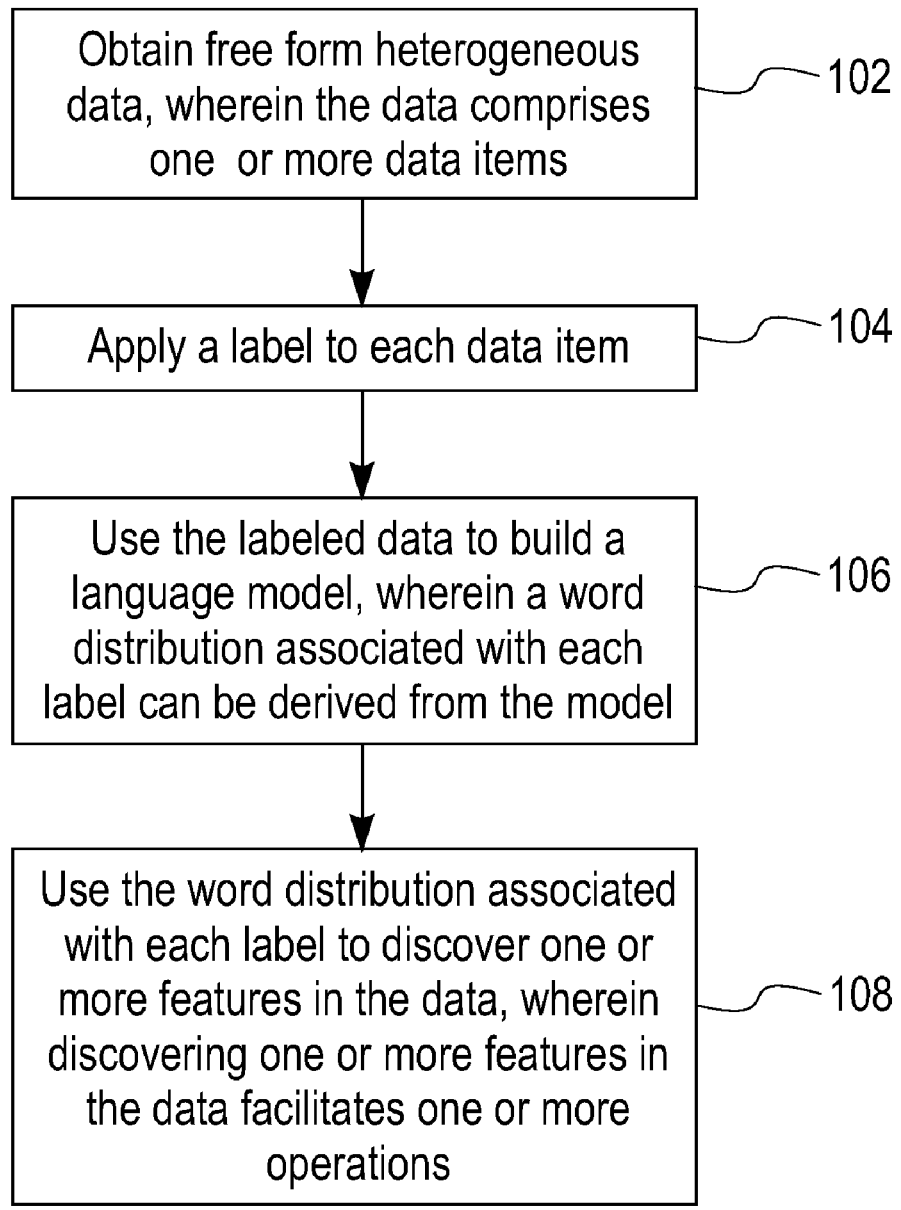
FIG. 1 is a flow diagram illustrating a method for automatically discovering one or more features in free form heterogeneous data, according to one embodiment of the invention.

FIG. 1 shows a flow diagram illustrating a method for automatically discovering one or more features in free form heterogeneous data, according to one embodiment of the invention. Step 102 includes obtaining free form heterogeneous data, wherein the data comprises one or more data items. A data item may include a portion of the free form heterogeneous data. Step 104 includes applying a label to each data item. Step 106 includes using the labeled data to build a language model, wherein a word distribution associated with each label can be derived from the model. Step 108 includes using the word distribution associated with each label to discover one or more features in the data, wherein discovering one or more features in the data facilitates one or more operations. Techniques for automatically discovering one or more features in free form heterogeneous data may also include the step of generating a dictionary vector, wherein each word of the data appears as a keyword feature.

Using the word distribution associated with each label to discover a feature in the data may include, for example, ranking a word probability for one or more features, as well as discovering one or more keyword features in the data, wherein a keyword feature may include a verb.

Using the word distribution associated with each label to discover a feature in the data may also include, for example, discovering one or more distance features in the data, discovering one or more formatting features in the data, discovering one or more character features in the data, and discovering one or more percentage features in the data.

Figure 2:
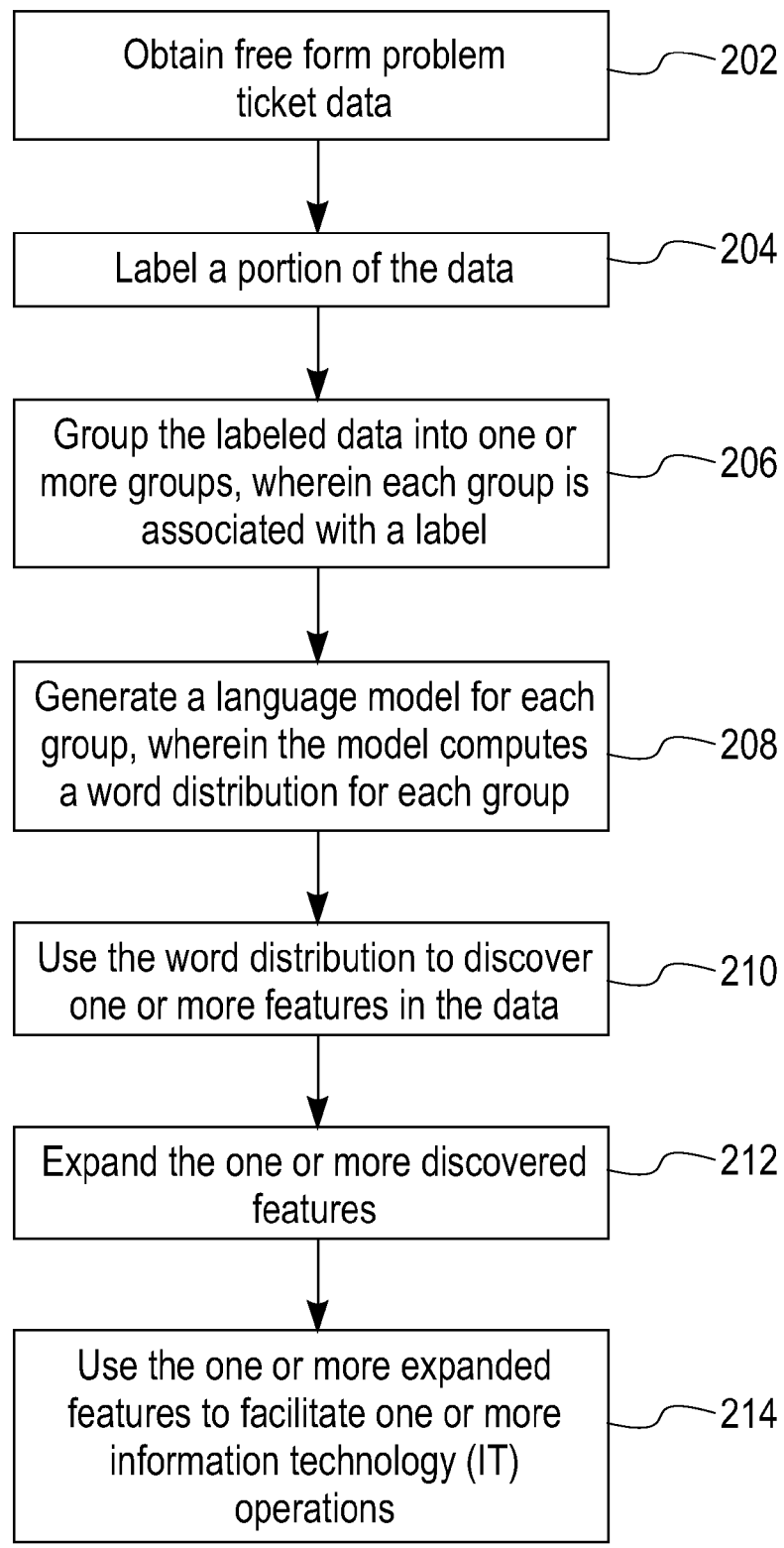
FIG. 2 is a flow diagram illustrating a method for automatically discovering one or more features in free form problem ticket data to facilitate one or more information technology (IT) operations, according to one embodiment of the invention.

FIG. 2 shows a flow diagram illustrating a method for automatically discovering one or more features in free form problem ticket data to facilitate one or more IT operations, according to one embodiment of the invention. Step 202 includes obtaining free form problem ticket data. Step 204 includes labeling a portion of the data. It is to be appreciated that labeling can be manually accomplished, automatically accomplished (when features are available), or some combination thereof. Step 206 includes grouping the labeled data into one or more groups, wherein each group is associated with a label. Step 208 includes generating a language model for each group, wherein the model computes a word distribution for each group.

Also, step 210 includes using the word distribution to discover one or more features in the data. The one or more features may include, for example, at least one of a formatting feature, a character feature and a percentage feature. Step 212 includes expanding the one or more discovered features. Expanding the one or more discovered features may include, for example, computing a probability indicating a relationship between two or more features, incorporating a portion of unlabeled free form problem ticket data, and identifying one or more correlations with one or more features from an external resource. An external resource may include, for example, at least one of a thesaurus and a set of rules used to identify resolution data in a different database. Step 214 includes using the one or more expanded features to facilitate one or more IT operations.

Using the word distribution to discover a feature in the data may include, for example, using the word distribution to discover a keyword feature, and at least one of computing a variance of a set of one or more numbers, computing an inverse group frequency, and manually selecting a result from at least one of computing a variance of a set of one or more numbers and computing an inverse group frequency. Also, using the word distribution to discover a feature in the data may include, for example, discovering a distance feature. Using the word distribution to discover a distance feature may include at least one of computing a Kullback-Leibler divergence (K-L divergence) between a word distribution of a query data and the word distribution of a group, and computing a smallest K-L divergence between a word distribution of a query data and the word distribution of each data in each group.

Techniques for automatically discovering one or more features in free form problem ticket data may also include the step of generating a dictionary vector, wherein each word of the data appears as a keyword feature.

It is to be appreciated that, in one embodiment, feature discovery can be done in multiple iterations of at least portions of the process shown in FIG. 2. That is, in a first round, manual labels are used; after features are obtained and the data is automatically labeled, a second round of the process is performed with those new labels. It is to be understood that labeling may, for example, be accomplished in accordance with one or more techniques described in U.S. patent application Ser. No. 11/675,392, filed concurrently herewith, the disclosure of which is incorporated by reference herein.

A variety of techniques, utilizing dedicated hardware, general purpose processors, firmware, software, or a combination of the foregoing may be employed to implement one or more embodiments of the present invention. One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

Figure 3:
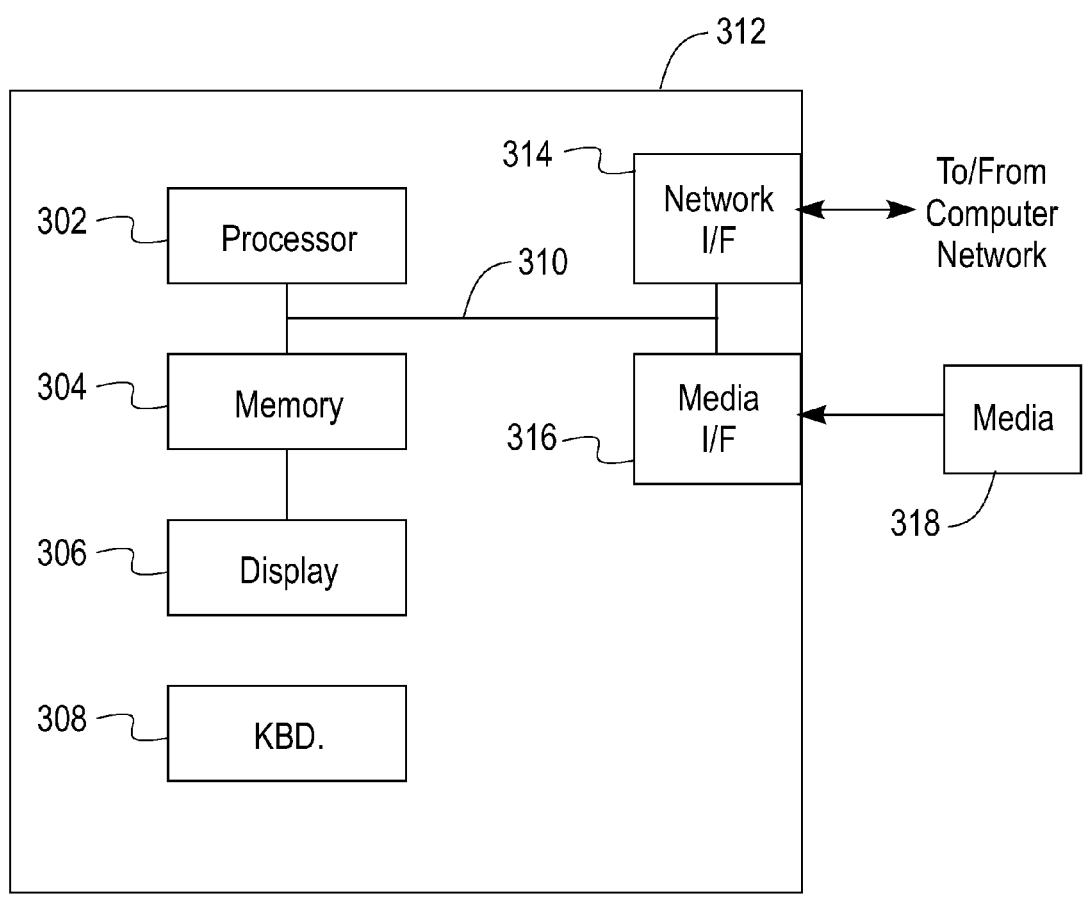
FIG. 3 is a system diagram of an exemplary computer system on which one or more embodiments of the present invention can be implemented.

One implementation of the present invention makes substantial use of software running on a general purpose computer or workstation. With reference to FIG. 3, such an implementation might employ, for example, a processor 302, a memory 304, and an input and/or output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 302, memory 304, and input and/or output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 318) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 304), magnetic tape, a removable computer diskette (for example media 318), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 302 coupled directly or indirectly to memory elements 304 through a system bus 310. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem, wireless cards, and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Figure 4:
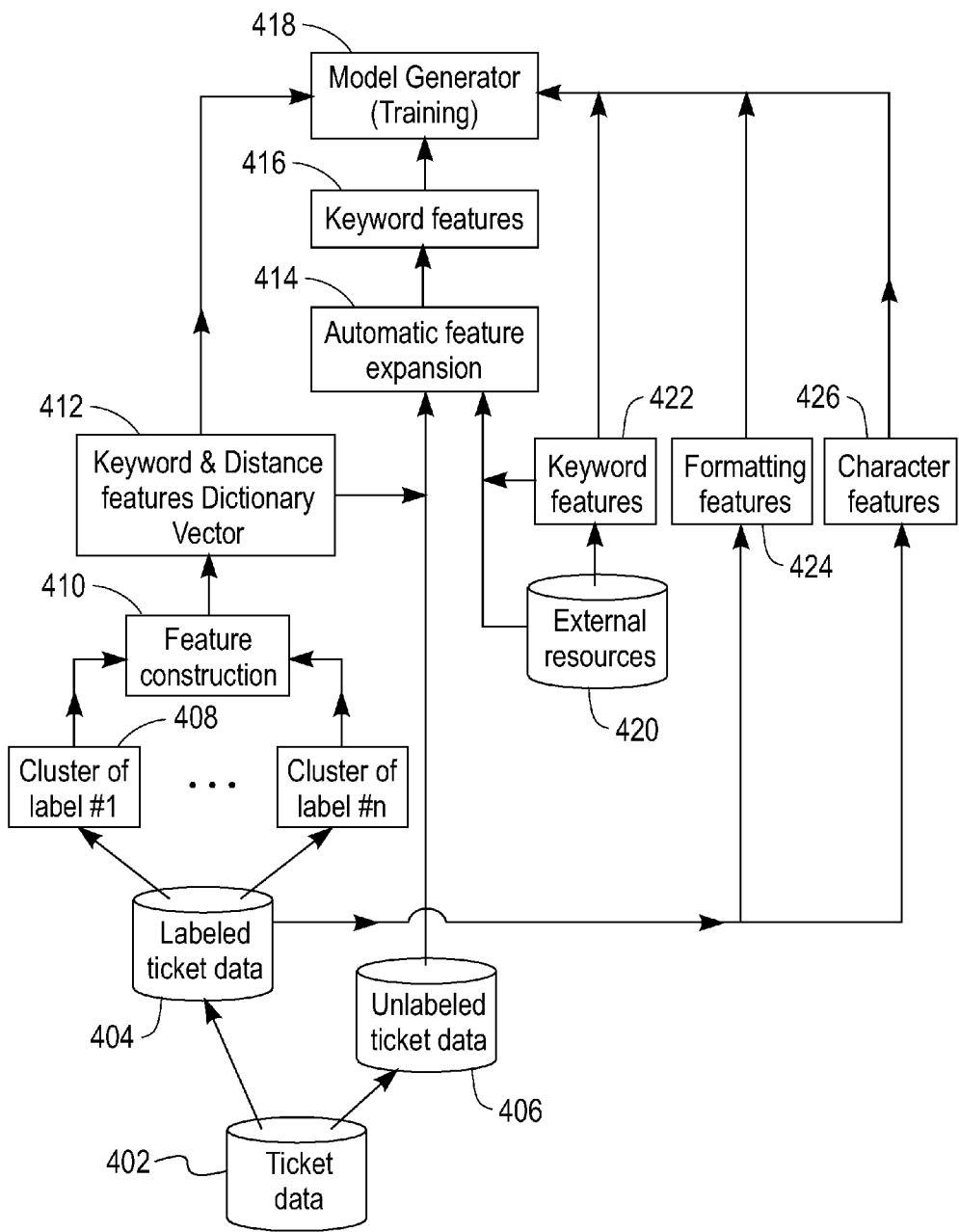
FIG. 4 is a diagram illustrating an exemplary system for automatically discovering one or more features in free form problem ticket data to facilitate one or more information technology (IT) operations, according to one embodiment of the invention.

FIG. 4 is a diagram illustrating an exemplary system for automatically discovering one or more features in free form problem ticket data to facilitate one or more information technology (IT) operations, according to one embodiment of the invention. FIG. 4 includes enumerated elements as well as enumerated steps, as described below.

As illustrated in FIG. 4, element 402 is a database, a collection of files, or a file that stores problem ticket data. In one or more embodiments of the present invention, a pre-processing step to segment the free text data into units can be applied to the free form data, as described, for example, in U.S. patent application Ser. No. 11/675,392, filed concurrently herewith, the disclosure of which is incorporated by reference herein.

Element 404 is a randomly chosen small part of the element 402 data, which has been manually labeled. An example of potential labels for ticket data is given, for example, in U.S. patent application Ser No. 11/675,392, filed concurrently herewith, the disclosure of which is incorporated by reference herein. Element 406 is a database, a collection of files, or a file that stores the unlabeled data representing the remaining part of element 402 after the data for element 404 has been selected.

Element 408 represents a collection of clusters of the labeled text units from element 404, with each cluster (or group) grouped by their labels. Step 410 designates the text feature builder, which generates a language model for each group belonging to element 408. The word distribution is computed in each group as follows:

$$P(w \mid C_i) = f(w, C_i) \bigg/ \sum_w f(w, C_i)$$

where $f(w, C_i)$ is the frequency of word w in the $i^{th}$ cluster, and $P(w|C_i)$ represents the probability of word w in the cluster. The word distribution is used to extract keyword features and distance features in step 412 as described below.

For the extraction of distinct words as keyword features, one or more potential methods may be implemented. For example, one method is extraction by variance of the set of numbers $X_i = P(w|C_i)$:

$$\mathrm{Var}(X_i) = E((X - \overline{X})^2).$$

This variance indicates the statistical dispersion of the distribution of the word w in different groups or clusters. Exhibiting a larger variance as compared to other words illustrates that the word w can serve to distinguish the groups and, therefore, it is an appropriate keyword feature.

Another exemplary method of extracting distinct words as keyword features is extraction by inverse cluster frequency (icf):

$$icf(w) = \log \frac{|C|}{|w \subset C_i|}$$

where $|C|$ is the number of all clusters (or groups), and $|w \subset C_i|$ is the number of clusters that contain the word w, that is, $P(w|C_i) > 0$. A threshold can also be set to evaluate the validity of a predicate such as $P(w|C_i) >$ threshold. Inverse cluster frequency has the property of capturing the words that appear only in a few groups or clusters, allowing for their automatic selection as features in the respective groups.

Yet another exemplary method of extracting distinct words as keyword features is extraction by manual selection from the results generated by one of the two methods described above.

Distance features characterize the similarity of a given text unit (for example, a line) with the other text units in the group or cluster to which it belongs. The expected behavior is that the smaller the distance between a text unit and an existent group, the higher the probability with which the automatic labeling system assigns that group's label to the text unit. For the extraction of distance features, one or more potential methods may be implemented.

For example, one method is computing a Kullback-Leibler divergence (K-L divergence) between the word distribution of the current text unit (here line L) and the word distribution of group i:

$$KL(P(w \mid L) \| P(w \mid C_i)) = \sum_w P(w \mid L) \log \frac{P(w \mid L)}{P(w \mid C_i)}$$

Another exemplary method is computing the smallest K-L divergence between the word distribution of the current text unit (here line L) and the word distribution of any text unit (L) in each group:

$$\min_{L' \in C_i} (KL(P(w \mid L) \parallel P(w \mid L'))) = \sum_w P(w \mid L) \log \frac{P(w \mid L)}{P(w \mid L')}$$

Besides keyword and distance features, dictionary vectors can also be automatically generated in step 412 to include all the words that appear in the training set. A dictionary vector can be viewed as a large keyword feature set where each word in the training set appears as one distinct keyword feature. As described above, differentiating the text units' content is advantageous for one or more applications of the techniques described herein. As an example, in problem ticket applications, there exists a need to distinguish between problem description and problem resolution data which have similar formatting (that is, natural language). Capturing every keyword in each text unit type significantly improves the differentiation. However, due to the large size of the dictionary vectors, they are expensive to use and infeasible to conjunct. Therefore, automatically discovering the relevant keyword and distance features remains advantageous.

Element 414 represents the feature expansion block. In step 416, the keyword features are expanded based on $P(w \mid w_t)$, which is the probability that indicates the relationships between two terms. This probability is computed based on word co-occurrence as follows:

$$P(w \mid w_t) = f(w, w_t) \Big/ \sum_w f(w, w_t)$$

where $w_t$ is a selected keyword feature, and $f(w, w_t)$ is the co-occurrence of word w and word $w_t$ in a fix sized window. As way of example, let the word "update" be an extracted keyword feature in the data set, and let the word "follow" appear with a high probability in a given window size from the line containing "update." Element 414 captures this co-occurrence and automatically expands the keyword feature of "update" with the word "follow."

In an illustrative embodiment of the present invention, element 410 and element 414 target only the verbs in a particular set of data.

Element 418 is the model generator block, which represents the training process in the supervised/semi-supervised machine learning. An example of a potential machine learning algorithm that could leverage the result of the techniques described herein is the Conditional Random Fields (CRFs).

Element 420 represents one or more external resources that can also contribute to feature selection and expansion. An example of an external resource is a set of keyword based rules used to identify resolution tickets in a different ticket database. Another example of an external resource is a thesaurus, which can be used to discover related keywords and automatically expand them with new keyword features.

An illustrative embodiment of the present invention includes automatic discovery of keyword features through expansion. Also, in one or more embodiments of the present invention, other types of features can be expanded, as described below.

As illustrated in FIG. 4, one or more keyword features can be expanded via step 422. Also, formatting features can be expanded via step 424. Formatting properties such as, for example, line breaks, white space gaps, and special character separators, are employed in documents such as problem tickets to improve readability. A common usage of formatting is to separate different contents by different formatting and to show the integrity of a given content type by same and/or similar formatting. Examples of potential formatting features are listed below in Table I.

TABLE I

Description of the Formatting Features Binary Valued

| Feature | Description |
| --- | --- |
| Three tokens on a line | Contains three or more white space-separated tokens. |
| Ten tokens on a line | Contains ten or more white space-separated tokens. Most of natural language-text lines contain this feature. |
| All space characters | Matches the regular expression "^\s*$", a blank line. |
| Space at start | Contains four consecutive white spaces at the beginning of a line. |

As also illustrated in FIG. 4, one or more character features can be expanded via step 426. Printable characters also convey information about the type of line being observed. The use of digits, keywords, and line layout, contribute to making the lines recognizable as being part of an information type or not. Potential character features are listed below in Table II.

TABLE II

Description of the Character Features

| Feature | Description |
| --- | --- |
| Alphabet characters (A-Za-z) | Percentage of the alphabet characters in the line. |
| Digit characters (0-9) | Percentage of the digit characters in the line. |
| Special characters | Percentage of the non-white-space, non-alphabet and non-digit characters in the line. |
| Time feature | Contains NN:NN:NN, where N is a digit. |
| Link feature | Contains "://". |
| Contact feature | Contains +/−N, where C is an alphabet character. |
| Email feature | Contains "@". |
| Length features | Line is long then 10/20/40 characters. |
| Version features | Contains [N.]{+}N, where N is a digit. |

As another example, one or more percentage features can be expanded. The features described above can be binary valued or expressed in percentages. Thus, as way of example, for binary features a "1" indicates the presence of the feature, while a "0" indicates the absence of the feature. For percentage features, a threshold is set. Tables I and II exemplify binary valued features, while Table III illustrates examples of percentage features with a correspondent threshold.

TABLE III

Thresholds of the percentage features

| Feature | Threshold |
| --- | --- |
| Percentage of white space | 30% |
| Strict alignment | 70% |
| Alphabet characters | 60% |
| Digit characters | 70% |
| Separator characters | 80% |

One or more embodiments of the present invention can be implemented as a computer program, for example written in Java or C programming language.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, performed using a data processing system, of automatically discovering one or more features in free form heterogeneous data, the method comprising the steps of:
obtaining free form heterogeneous data, wherein the data comprises one or more data items, and wherein at least a portion of the data is textual data representing one or more inquiries received by a call center;
applying a label to each data item;
using the labeled data to build a language model, wherein a word distribution associated with each label is derived from the model, and wherein the language model comprises a probability of a word occurring in a cluster of words, the probability comprising a frequency of the word within the cluster of words divided by a total number of words within the cluster of words; and
automatically discovering one or more features in the data using the word distribution associated with each label, wherein discovering one or more features in the data facilitates one or more operations that use at least a portion of the labeled data, and wherein the one or more features include text related features that are used for recognizing an information type of a particular unit of text;
wherein the data processing system comprises a memory and a processor coupled to the memory; and
wherein the obtaining step, the applying step, the labeled data using step, and the word distribution using step are preformed, at least in part, on the data processing system.

2. The method of claim 1, wherein the step of using the word distribution associated with each label to discover one or more features in the data comprises ranking a word probability for one or more features.

3. The method of claim 1, wherein the step of using the word distribution associated with each label to discover one or more features in the data comprises discovering one or more keyword features in the data.

4. The method of claim 3, wherein the one or more keyword features comprise a verb.

5. The method of claim 1, wherein the step of using the word distribution associated with each label to discover one or more features in the data comprises discovering one or more distance features in the data.

6. The method of claim 1, further comprising the step of generating a dictionary vector, wherein each word of the data appears as a keyword feature.

7. The method of claim 1, wherein the step of using the word distribution associated with each label to discover one or more features in the data comprises discovering one or more formatting features in the data.

8. The method of claim 1, wherein the step of using the word distribution associated with each label to discover one or more features in the data comprises discovering one or more character features in the data.

9. The method of claim 1, wherein the step of using the word distribution associated with each label to discover one or more features in the data comprises discovering one or more percentage features in the data.

10. A method, performed on a data processing system, of automatically discovering one or more features in free form problem ticket data to facilitate one or more information technology (IT) operations, the method comprising the steps of:
obtaining free form problem ticket data, wherein at least a portion of the data is textual data representing one or more inquiries received by a call center;
labeling a portion of the data;
grouping the labeled data into one or more groups, wherein each group is associated with a label;
generating a language model for each group, wherein the model computes a word distribution for each group; and wherein the language model for each group comprises a probability of a word occurring in the group, the probability comprising a frequency of the word within the group divided by a total number of words within the group;
automatically discovering one or more features in the data using the word distribution, wherein the one or more features include text related features that are used for recognizing an information type of a particular unit of text;
expanding the one or more discovered features; and
using the one or more expanded features to facilitate one or more information technology (IT) operations;
wherein the data processing system comprises a memory and a processor coupled to the memory; and
wherein the obtaining step, the labeling step, the generating step, the word distribution using step, the expanding step, and the expanded feature step are preformed, at least in part, on the data processing system.

11. The method of claim 10, wherein the step of expanding the one or more discovered features comprises identifying one or more correlations with one or more features from an external resource.

12. The method of claim 11, wherein the external resource comprises at least one of a thesaurus and a set of rules used to identify data in a different database.

13. The method of claim 10, wherein the step of expanding the one or more discovered features comprises computing a probability indicating a relationship between two or more features, and wherein the probability indicating a relationship comprises a frequency of a co-occurrence of a first feature of the two or more features and a second feature of the two or more features in a group of features divided by a total number of co-occurrences of features within the group of features.

14. The method of claim 10, wherein the step of using the word distribution to discover one or more features in the data comprises using the word distribution to discover a keyword feature.

15. The method of claim 14, wherein the step of using the word distribution to discover a keyword feature comprises at least one of computing a variance of a set of numbers, computing an inverse group frequency, and manually selecting a result from at least one of computing a variance of a set of one or more numbers and computing an inverse group frequency, wherein the computing of a variance of a set of numbers comprises subtracting a mathematical mean of the set of numbers from at least one number of the set of numbers, and wherein the computing of an inverse group frequency comprises dividing a number of a plurality of clusters of words by a number of clusters of words that contain a specific word, the plurality of clusters of words comprising each of the clusters of words that contain the specific word.

16. The method of claim 10, wherein the step of using the word distribution to discover one or more features in the data comprises using the word distribution to discover a distance feature.

17. The method of claim 16, wherein using the word distribution to discover a distance feature comprises at least one of computing a Kullback-Leibler divergence (K-L divergence) between a word distribution of a query data and the word distribution of a group, and computing a smallest K-L divergence between a word distribution of a query data and the word distribution of each data in each group.

18. The method of claim 10, wherein the one or more features comprise at least one of a formatting feature, a character feature and a percentage feature.

19. The method of claim 10, further comprising the step of generating a dictionary vector, wherein each word of the data appears as a keyword feature.

20. The method of claim 10, wherein the step of wherein the step of expanding the one or more discovered features comprises incorporating a portion of unlabeled free form problem ticket data.

21. An apparatus for automatically discovering one or more features in free form heterogeneous data, the apparatus comprising:
a memory; and
at least one processor coupled to the memory and operative to:
obtain free form heterogeneous data, wherein the data comprises one or more data items, and wherein at least a portion of the data is textual data representing one or more inquiries received by a call center;
apply a label to each data item;
use the labeled data to build a language model, wherein a word distribution associated with each label is derived from the model, and wherein the language model comprises a probability of a word occurring in a cluster of words, the probability comprising a frequency of the word within the cluster of words divided by a total number of words within the cluster of words; and
automatically discover one or more features in the data using the word distribution associated with each label, wherein discovering one or more features in the data facilitates one or more operations that use at least a portion of the labeled data, and wherein the one or more features include text related features that are used for recognizing an information type of a particular unit of text.

22. The apparatus of claim 21, wherein the at least one processor is operative to use the word distribution associated with each label to discover at least one of a keyword feature, a distance feature, a formatting feature, a character feature and a percentage feature.

23. The apparatus of claim 21, wherein the at least one processor is further operative to generate a dictionary vector, wherein each word of the data appears as a keyword feature.

24. A computer program product comprising a computer readable storage medium having computer useable program code for automatically discovering one or more features in free form heterogeneous data in order to, at least in part, resolve problems customers experience with commercial products, the computer program product including:
computer useable program code for obtaining free form heterogeneous data, wherein the data comprises one or more data items, and wherein at least a portion of the data is textual data representing one or more inquiries received by a call center;
computer useable program code for applying a label to each data item;
computer useable program code for using the labeled data to build a language model, wherein a word distribution associated with each label is derived from the model, and wherein the language model comprises a probability of a word occurring in a cluster of words, the probability comprising a frequency of the word within the cluster of words divided by a total number of words within the cluster of words, the cluster of words associated with one of the applied labels; and
computer useable program code for automatically discovering one or more features in the data using the word distribution associated with each label, wherein discovering one or more features in the data facilitates one or more operations that use at least a portion of the labeled data, and wherein the one or more features include text related features that are used for recognizing an information type of a particular unit of text.

25. The computer program product of claim 24, wherein the computer usable program code for using the word distribution associated with each label to discover one or more features in the data comprises computer usable program code for using the word distribution associated with each label to discover at least one of a keyword feature, a distance feature, a formatting feature, a character feature and a percentage feature.

26. The computer program product of claim 24, further including computer usable program code for generating a dictionary vector, wherein each word of the data appears as a keyword feature.

27. A computer program product comprising a computer readable storage medium having computer useable program code for automatically discovering one or more features in free form problem ticket data to facilitate one or more information technology (IT) operations data in order to, at least in part, resolve problems customers experience with commercial products, the computer program product including:
computer useable program code for obtaining free form problem ticket data, wherein at least a portion of the data is textual data representing one or more inquiries received by a call center;
computer useable program code for labeling a portion of the data;
computer useable program code for grouping the labeled data into one or more groups, wherein each group is associated with a label;
computer useable program code for generating a language model for each group, wherein the model computes a word distribution for each group, and wherein the language model comprises a probability of a word occurring in the group, the probability comprising a frequency of the word within the group divided by a total number of words within the group;
computer useable program code for automatically discovering one or more features in the data using the word distribution, wherein the one or more features include text related features that are used for recognizing an information type of a particular unit of text;
computer useable program code for expanding the one or more discovered features; and
computer useable program code for using the one or more expanded features to facilitate one or more information technology (IT) operations.

28. The computer program product of claim 27, wherein the computer usable program code for expanding the one or more discovered features comprises computer usable program code for identifying one or more correlations with one or more features from an external resource.

29. The computer program product of claim 28, wherein the computer usable program code for identifying one or more correlations with one or more features from an external resource comprises computer usable program code for identifying one or more correlations with at least one of a thesaurus and a set of rules used to identify data in a different database.

30. The computer program product of claim 27, wherein the computer usable program code for expanding the one or more discovered features comprises computer usable program code for computing a probability indicating a relationship between two or more features, and wherein the probability indicator comprises a frequency of a co-occurrence of a first feature of the two or more features and a second feature of the two or more features in a group of features divided by a total number of co-occurrences of features within the group of features.

31. The computer program product of claim 27, wherein the computer usable program code for using the word distribution to discover one or more features in the data comprises computer usable program code for using the word distribution to discover a keyword feature.

32. The computer program product of claim 31, wherein the computer usable program code for using the word distribution to discover a keyword feature comprises computer usable program code for at least one of computing a variance of a set of numbers, computing an inverse group frequency, and manually selecting a result from at least one of computing a variance of a set of one or more numbers and computing an inverse group frequency, wherein the computing of a variance of a set of numbers comprises subtracting a mathematical mean of the set of numbers from at least one number of the set of numbers, and wherein the computing of an inverse group frequency comprises dividing a number of a plurality of clusters of words by a number of clusters of words that contain a specific word, the plurality of clusters of words comprising each of the clusters of words that contain the specific word.

33. The computer program product of claim 27, wherein the computer usable program code for using the word distribution to discover one or more features in the data comprises computer usable program code for using the word distribution to discover a distance feature.

34. The computer program product of claim 33, wherein the computer usable program code for using the word distribution to discover a distance feature comprises computer usable program code for at least one of computing a Kullback-Leibler divergence (K-L divergence) between a word distribution of a query data and the word distribution of a group, and computing a smallest K-L divergence between a word distribution of a query data and the word distribution of each data in each group.

35. The computer program product of claim 27, wherein the computer usable program code for using the word distribution to discover one or more features from the data comprises computer usable program code for using the word distribution to discover at least one of a formatting feature, a character feature and a percentage feature.

* * * * *